United States Patent
Zhang et al.

(10) Patent No.: US 11,526,660 B2
(45) Date of Patent: Dec. 13, 2022

(54) INFORMATION PROCESSING APPARATUS FOR COMPLEMENTING A HEADING OF A TABLE

(71) Applicant: KABUSHIKI KAISHA TOSHIBA, Tokyo (JP)

(72) Inventors: Ruigang Zhang, Kawasaki Kanagawa (JP); Shinichi Nagano, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/013,687

(22) Filed: Sep. 7, 2020

(65) Prior Publication Data
US 2021/0264100 A1 Aug. 26, 2021

(30) Foreign Application Priority Data
Feb. 26, 2020 (JP) .............................. JP2020-030937

(51) Int. Cl.
*G06F 40/177* (2020.01)
(52) U.S. Cl.
CPC .................................. *G06F 40/177* (2020.01)
(58) Field of Classification Search
None
See application file for complete search history.

(56) References Cited

U.S. PATENT DOCUMENTS

| | | | | |
|---|---|---|---|---|
| 7,953,592 B2* | 5/2011 | Kawamura | ........... | G06F 16/367 704/9 |
| 8,165,994 B2* | 4/2012 | Carnathan | ........... | G06F 16/2358 707/648 |
| 9,852,121 B2* | 12/2017 | Folting | .................. | G06Q 10/10 |
| 10,635,897 B2 | 4/2020 | Sunagawa et al. | | |
| 2002/0169637 A1* | 11/2002 | Akers | .................... | G16H 40/67 705/3 |
| 2004/0049730 A1* | 3/2004 | Ishizaka | .................. | G06F 40/18 715/213 |
| 2009/0276692 A1* | 11/2009 | Rosner | .................. | G06F 40/177 715/227 |
| 2013/0041794 A1* | 2/2013 | Kashima | ................ | G06Q 40/00 705/30 |
| 2013/0086459 A1* | 4/2013 | Folting | ................. | G06F 16/283 715/212 |
| 2013/0117268 A1* | 5/2013 | Smith | .................... | G06F 40/117 707/739 |

(Continued)

FOREIGN PATENT DOCUMENTS

JP 2017-224240 A 12/2017
JP 6338036 B1 6/2018

(Continued)

*Primary Examiner* — Howard Cortes
(74) *Attorney, Agent, or Firm* — Finnegan, Henderson, Farabow, Garrett & Dunner, LLP

(57) ABSTRACT

An embodiment of the present invention provides an information processing apparatus capable of complementarily adding an attribute not included in a table in order to detect tables having a corresponding relationship. An information processing apparatus as an embodiment of the present invention includes a complementer. The complementer complementarily adds an attribute not included in a first table based on a content of at least one of the first table and an electronic document including the first table.

9 Claims, 13 Drawing Sheets

(56) References Cited

U.S. PATENT DOCUMENTS

| | | | | |
|---|---|---|---|---|
| 2015/0193423 A1* | 7/2015 | Folting | ................. | G06Q 10/10 |
| | | | | 715/212 |
| 2015/0309990 A1* | 10/2015 | Allen | .................... | G06F 16/245 |
| | | | | 704/9 |
| 2015/0324346 A1* | 11/2015 | Sankaran | ................ | G06F 16/25 |
| | | | | 715/212 |
| 2016/0275066 A1* | 9/2016 | Otero | .................. | G06F 3/04845 |
| 2017/0109424 A1* | 4/2017 | Oberhofer | ................. | G06F 7/20 |
| 2018/0240019 A1 | 8/2018 | Sato et al. | | |

FOREIGN PATENT DOCUMENTS

| | | |
|---|---|---|
| JP | 2019-79321 A | 5/2019 |
| JP | 2019-117484 A | 7/2019 |
| JP | 2019-149125 A | 9/2019 |

* cited by examiner

"Illustrates the yield point, yield strength, pull strength and elongation of SM400B"

| Mechanical Properties | | | Material Symbol |
|---|---|---|---|
| Yield Point or Yield Strength (N/mm²) | Steel Material Thickness (mm) | not more than 16 | SM400B |
| | | more than 16 and not more than 40 | |
| | | more than 40 and not more than 75 | |
| | | more than 75 and not more than 100 | |
| | | more than 100 and not more than 160 | |
| | | more than 160 and not more than 200 | |
| | | not less than 245 | |
| | | not less than 235 | |
| | | not less than 215 | |
| | | not less than 215 | |
| | | not less than 205 | |
| | | not less than 195 | |
| Pull Strength (N/mm²) | Steel Material Thickness (mm) | not more than 100 | 400~510 |
| | | more than 100 and not more than 200 | 400~510 |
| Elongation (%) | Steel Material Thickness (mm) | not more than 5 | Specimen No. 5 not less than 23 |
| | | more than 5 and not more than 16 | Specimen No. 1A not less than 18 |
| | | more than 16 and not more than 50 | Specimen No. 1A not less than 22 |
| | | more than 50 | Specimen No. 4 not less than 24 |

FIG. 2

Title: Yield Point or Yield Strength

| Type Symbol | Steel Material Thickness mm | | | | | |
|---|---|---|---|---|---|---|
| | not more than 16 | more than 16 and not more than 40 | more than 40 and not more than 75 | more than 75 and not more than 100 | more than 100 and not more than 160 | more than 160 and not more than 200 |
| SM400A SM400B | not less than 245 | not less than 235 | not less than 215 | not less than 215 | not less than 205 | not less than 195 |
| SM400C | | | | | — | — |
| SM490A SM490B | not less than 325 | not less than 315 | not less than 295 | not less than 295 | not less than 285 | not less than 275 |
| SM490C | | | | | — | — |

FIG. 3

| Mechanical Properties | Mechanical Properties | Mechanical Properties | Mechanical Properties | Material Symbol |
|---|---|---|---|---|
| Yield Point or Yield Strength | Steel Material Thickness | not more than 16 | | SM400B |
| Yield Point or Yield Strength | Steel Material Thickness | more than 16 and not more than 40 | | SM400B |
| Yield Point or Yield Strength | Steel Material Thickness | more than 40 and not more than 75 | | SM400B |
| Yield Point or Yield Strength | Steel Material Thickness | more than 75 and not more than 100 | | SM400B |
| Yield Point or Yield Strength | Steel Material Thickness | more than 100 and not more than 160 | | SM400B |
| Yield Point or Yield Strength | Steel Material Thickness | more than 160 and not more than 200 | | SM400B |
| Pull Strength | Steel Material Thickness | not more than 100 | | SM400B |
| Pull Strength | Steel Material Thickness | more than 100 and not more than 200 | | SM400B |
| Elongation | Steel Material Thickness | not more than 5 | | SM400B |
| Elongation | Steel Material Thickness | more than 5 and not more than 16 | | SM400B |
| Elongation | Steel Material Thickness | more than 16 and not more than 50 | | SM400B |
| Elongation | Steel Material Thickness | more than 50 | | SM400B |

FIG. 6

| Type Symbol | Steel Material Thickness | Steel Material Thickness | Steel Material Thickness | Steel Material Thickness | Steel Material Thickness | Steel Material Thickness |
|---|---|---|---|---|---|---|
| Type Symbol | not more than 16 | more than 16 and not more than 40 | more than 40 and not more than 75 | more than 75 and not more than 100 | more than 100 and not more than 160 | more than 160 and not more than 200 |
| SM400A | | | | | | |
| SM400B | | | | | | |
| SM400C | | | | | | |
| SM490A | | | | | | |
| SM490B | | | | | | |
| SM490C | | | | | | |

FIG. 7

| Type Symbol | Yield Point or Yield Strength | Yield Point or Yield Strength | Yield Point or Yield Strength | Yield Point or Yield Strength | Yield Point or Yield Strength |
| --- | --- | --- | --- | --- | --- |
| Type Symbol | Steel Material Thickness | Steel Material Thickness | Steel Material Thickness | Steel Material Thickness | Steel Material Thickness |
| Type Symbol | not more than 16 | more than 16 and not more than 40 | more than 40 and not more than 75 | more than 75 and not more than 100 | more than 100 and not more than 160 | more than 160 and not more than 200 |
| SM400A | | | | | | |
| SM400B | | | | | | |
| SM400C | | | | | | |
| SM490A | | | | | | |
| SM490B | | | | | | |
| SM490C | | | | | | |

FIG. 8

The steel plate is subjected to the test shown in 7., and its cast analysis is shown in the table below

| Material Symbol | | C | Si | Mn | P | S |
|---|---|---|---|---|---|---|
| SM400A | Thickness not more than 50 mm | not more than 0.23 | — | not less than 2.4 × C$^{(1)}$ | not more than 0.035 | not more than 0.035 |
| | Thickness more than 50 and not more than 200 mm | not more than 0.25 | | | | |
| SM400B | Thickness not more than 50 mm | not more than 0.20 | not more than 0.35 | 0.60~1.40 | | |
| | Thickness more than 50 and not more than 200 mm | not more than 0.22 | | | | |
| SM400C | Thickness not more than 100 mm | not more than 0.18 | not less than 0.35 | not more than 1.40 | | |

FIG.10

| Material Symbol | Material Symbol | Material Symbol | Material Symbol | Material Symbol | Cast Analysis Chemical Component C | Cast Analysis Chemical Component Si | Cast Analysis Chemical Component Mn | Cast Analysis Chemical Component P | Cast Analysis Chemical Component S |
|---|---|---|---|---|---|---|---|---|---|
| SM400A | Thickness | not more than 50 mm | | | | | | | |
| SM400A | Thickness | more than 50 and not more than 200 mm | | | | | | | |
| SM400B | Thickness | not more than 50 mm | | | | | | | |
| SM400B | Thickness | more than 50 and not more than 200 mm | | | | | | | |
| SM400C | Thickness | not more than 100 mm | | | | | | | |

FIG.11

INFORMATION PROCESSING APPARATUS FOR COMPLEMENTING A HEADING OF A TABLE

CROSS-REFERENCE TO RELATED APPLICATION (S)

This application is based upon and claims the benefit of priority from Japanese Patent Application No. 2020-030937, filed Feb. 26, 2020; the entire contents of which are incorporated herein by reference.

FIELD

An embodiment relates to an information processing apparatus, an information processing method, and a non-transitory computer readable medium.

BACKGROUND

Documents such as technical standards may often present prescriptions such as numerical ranges in tables for easy understanding by human. However, tables have various structures, and it is difficult to automatically detect tables having a corresponding relationship.

For example, a desired character string can be detected by using a search function of software, a search engine or the like. However, information indicated by cells of a table may be contained in the electronic document but not indicated in the table itself. Also, headings in each table may be located differently. Thus, an attempt to automatically detect tables having a corresponding relationship may often result in a misdetection that the tables have no corresponding relationship. For that reason, corresponding relationships between tables are visually checked by human, and the checking requires a huge amount of time.

BRIEF DESCRIPTION OF THE DRAWINGS

FIG. 2 is a diagram illustrating a first example table on which to perform determination;

FIG. 3 is a diagram illustrating a second example table on which to perform determination;

FIG. 6 is a diagram of the first example table on which to perform determination after division;

FIG. 7 is a diagram of the second example table on which to perform determination after division;

FIG. 8 is a diagram of the second example table on which to perform determination after complementation;

FIG. 10 is a diagram illustrating a third example table on which to perform determination;

FIG. 11 is a diagram of the third example table on which to perform determination after complementation;

DETAILED DESCRIPTION

An embodiment of the present invention provides an information processing apparatus capable of complementarily adding an attribute not included in a table in order to detect tables having a corresponding relationship.

An information processing apparatus as an embodiment of the present invention includes a complementer. The complementer complementarily adds an attribute not included in a first table based on a content of at least one of the first table and an electronic document including the first table.

An embodiment will be explained in detail below with reference to the accompanying drawings. The present invention is not limited to the embodiment.

An Embodiment of the Present Invention

Figure 1:
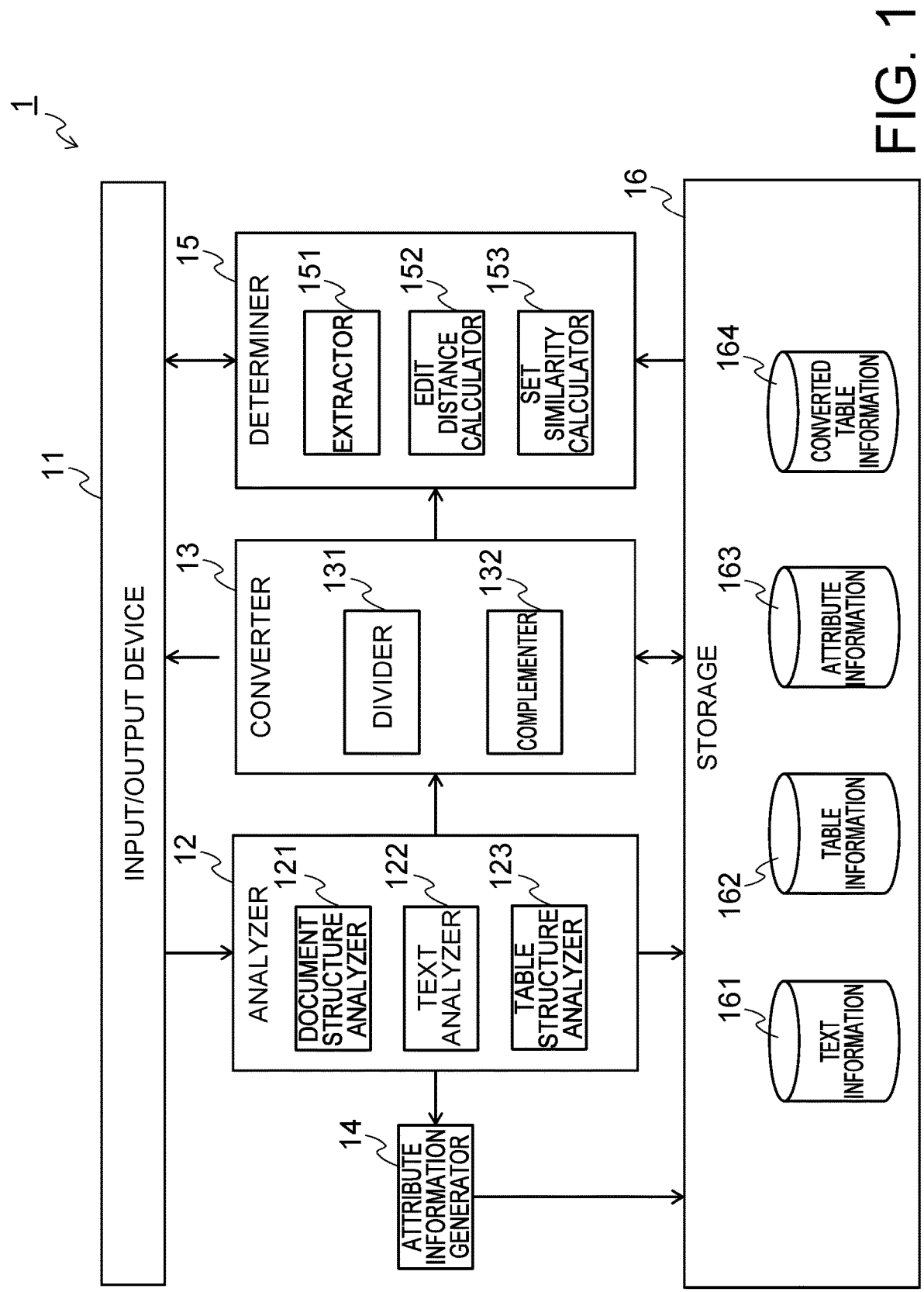
FIG. 1 is a block diagram illustrating an example of an information processing apparatus according to an embodiment of the present invention.

FIG. 1 is a block diagram illustrating an example of an information processing apparatus according to an embodiment of the present invention. The information processing apparatus 1 according to this embodiment includes an input/output device 11, an analyzer 12, a converter 13, an attribute information generator 14, a determiner 15 and a storage 16. The analyzer 12 includes a document structure analyzer 121, a text analyzer 122 and a table structure analyzer 123. The converter 13 includes a divider 131 and a complementer 132. The determiner 15 includes an extractor 151, an edit distance calculator 152 and a set similarity calculator 153.

The information processing apparatus 1 performs conversion such as complementarily adding an attribute not included in a table in order to detect tables having a corresponding relationship. The information processing apparatus 1 then determines whether tables have a corresponding relationship based on converted tables. This prevents tables having a corresponding relationship from being determined as having no corresponding relationship due to omission of attribute names and the like.

It is assumed that a table on which to perform processing of the information processing apparatus 1 presents values of one or more attributes for one or more subjects. Note that the subjects may also be regarded as attributes of the table. The attributes indicate properties, characteristics or the like of the subjects. For example, the attributes include conditions for limiting the subjects. For example, if a cell in the table indicates a value of required hardness of material A having a thickness greater than or equal to a threshold, "material A" is a subject and "thickness greater than or equal to a threshold" and "required hardness" correspond to attributes.

Specifically, the information processing apparatus 1 determines whether two tables have a corresponding relationship based on a subject and attribute corresponding to a cell in one table and a subject and attribute corresponding to a cell in the other table. However, it is assumed that tables that can be compared have various and non-identical structures.

For example, whether subjects or attributes are indicated in row or column headings varies depending on the table. The row headings are typically cells in the first column, and the column headings are typically cells in the first row. Each cell in the second and subsequent rows and in the second and subsequent columns contains a value for each subject and each attribute. However, the headings may not be in the first column or the first row.

The headings may also extend over a plurality of rows or columns. For example, it is often the case that column headings are arranged over two rows, the column heading cells in the first row are combined, and the combined cell indicates a matter common to each attribute while each column heading cell in the second row indicates a matter not common to each attribute. Attributes may also be indicated in both of column headings and row headings.

FIG. 2 is a diagram illustrating a first example table on which to perform determination. The first table shown in FIG. 2 presents prescriptions for a steel material "SM400B". A subject of the first table is "SM400B". In FIG. 2, the first to third and fifth columns from the left in the table are used as row headings, and the row headings indicate attributes such as "Yield Point or Yield Strength", "Steel Material Thickness", "more than 40 and not more than 75" and the like. The fourth column indicates values of the attributes for the subject.

FIG. 3 is a diagram illustrating a second example table to be processed. The second table shown in FIG. 3 presents prescriptions about the yield point or yield strength of a plurality of steel materials. That is, a plurality of subjects are shown in the second table. The prescriptions about the steel material "SM400B" shown in FIG. 2 are also included in FIG. 3. However, "Yield Point or Yield Strength" is contained in the textual descriptions in the electronic document as the title of the table, not indicated in the table.

In the table of FIG. 3, the first and second rows from the top are used as column headings, and the attributes "Steel Material Thickness" and "more than 40 and not more than 75" are indicated in the column headings in FIG. 3. Also, records for two different subjects SM400A and SM400B are combined in one row. Also, cells indicating yield point or yield strength values (not less than 245 in FIG. 3) of SM400A, SM400B and SMB 400C for a steel material thickness not more than 16 mm are combined as one cell.

Also, in the examples of FIGS. 2 and 3, item names corresponding to subjects or attributes do not completely coincide. For example, the units for the numerical values are put in parentheses in the table of FIG. 2, and are not put in parentheses in the table of FIG. 3.

It is possible to estimate that the tables of FIG. 2 and FIG. 3 are tables relating to "SM400B" based on the fact that the tables of FIG. 2 and FIG. 3 include a common character string "SM400B". However, since the attribute "Yield Point or Yield Strength" is omitted from the table of FIG. 3, it cannot be recognized that values for the attribute "Yield Point or Yield Strength" are indicated in FIG. 3.

Also, although it is conceivable to compare the column headings or row headings, the attributes are indicated in the row headings in FIG. 2 while the attributes are indicated in the column headings in FIG. 3, and therefore they do not coincide.

As described above, if tables have different structures, it is difficult to discriminate whether the tables have a corresponding relationship even though it can be recognized that the tables relate to the same subject. However, the information processing apparatus 1 can determine that the tables have a corresponding relationship even in such cases.

Note that it is assumed that a table on which to perform processing of the information processing apparatus 1 is contained in an electronic document. The electronic document may be any analyzable electronic document such as an HTML (Hyper Text Markup Language) file or a PDF (Portable Document Format) file. For example, it may be a page of a website on the Internet. Note that the electronic document is not limited to a technical document as shown in FIGS. 2 and 3. Also, subjects indicated in the table are not particularly limited.

The internal configuration of the information processing apparatus 1 will now be described. Note that the internal configuration shown in FIG. 1 is an example, and components not illustrated in FIG. 1 may be present in the information processing apparatus 1. Also, the components of the information processing apparatus 1 shown in FIG. 1 may be subdivided, or may be integrated. Also, the components shown in FIG. 1 may be included in an apparatus separate from the information processing apparatus 1. For example, an apparatus including a converter for performing table conversion and an apparatus including a determiner for performing determination may be provided separately. Also, for example, the analyzer 12, the converter 13, the attribute information generator 14 and the determiner 15 may each be a separate apparatus. Also, for example, data for processing of the information processing apparatus 1 may be stored in a storage device such as a network area storage. That is, the storage 16 may be provided external to the information processing apparatus 1.

The input/output device 11 acquires information required for processing such as from an apparatus separate from the information processing apparatus 1, and outputs a processing result. Note that the input and output information is not particularly limited. For example, the input/output device 11 acquires an electronic document to be analyzed by the information processing apparatus 1, an identifier (ID) for identifying a table on which to perform determination, and the like.

Figure 4:
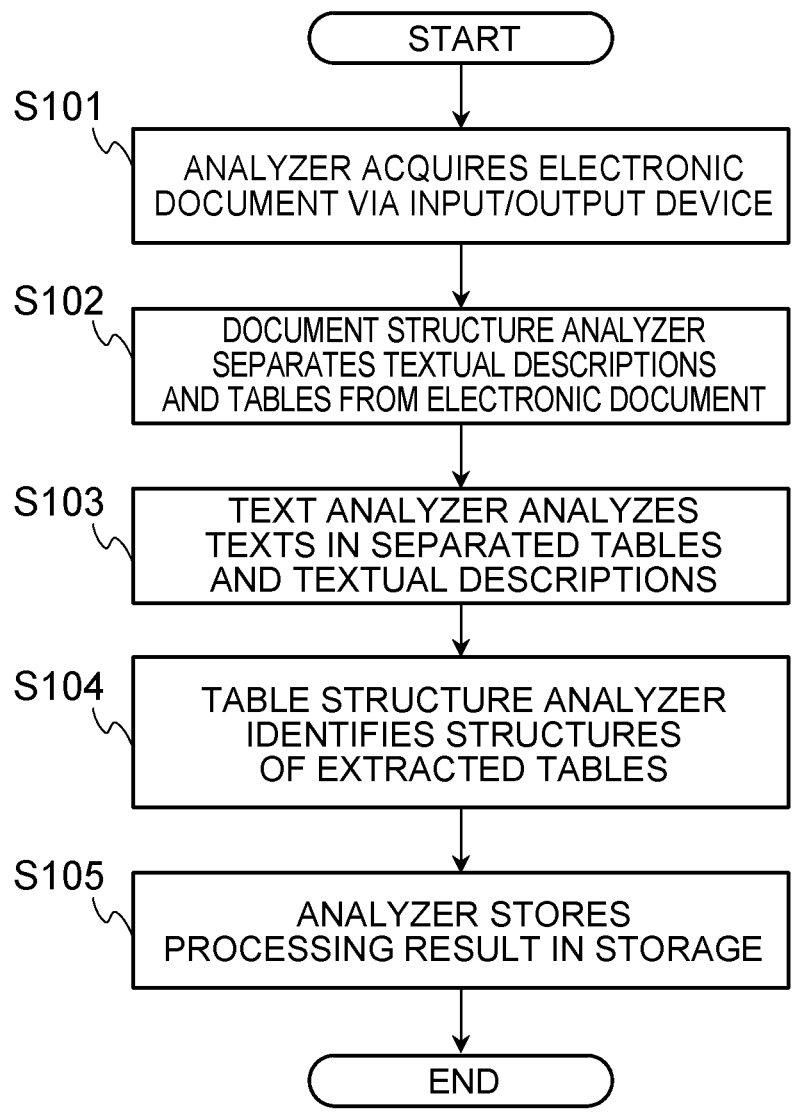
FIG. 4 is a diagram illustrating an example of a processing flow of an analyzer.

The analyzer 12 analyzes textual descriptions and tables included in an electronic document. FIG. 4 is a diagram illustrating an example of a processing flow of the analyzer 12. It is assumed that this flow is started when an electronic document is input to the input/output device 11.

The analyzer 12 acquires an electronic document via the input/output device 11 (S101). The document structure analyzer 121 of the analyzer 12 separates textual descriptions and tables from the electronic document (S102). Any known method may be used for the separation. For example, if the electronic document is a PDF file, various publicly-released extraction software and commands for extracting textual descriptions or tables may be used.

The text analyzer 122 of the analyzer 12 performs text analysis on each of the separated tables and textual descriptions (S103). For example, the text analyzer 122 detects a description for a table by searching for a predetermined character string. If a character string such as "table" or "description" is detected, it is estimated that a sentence including the character string describes a table around the sentence. Thus, the text analyzer 122 detects a sentence including such a character string. The predetermined character string may be expressed in regular expressions. For example, a character string consisting of a character string "table" and a certain numeral may be searched for.

In an electronic document such as HTML, table titles and the like are explicitly indicated in its source code. Thus, the text analyzer 122 may extract a character string expected to be a table title or the like from the source code of the electronic document.

The table structure analyzer 123 of the analyzer 12 identifies structures of the extracted tables (S104). The source code of an electronic document such as HTML or PDF includes tabs and the like for indicating table headings and the like. Thus, the table structure analyzer 123 may detect the location of headings, combined cells and the like based on the source code of the electronic document.

The analyzer 12 stores a processing result in the storage 16 (S105), and this flow ends. For example, text information 161 corresponding to the analyzed texts such as the name of the electronic document, table titles and descriptions for the tables is stored. Table information 162 indicating the extracted tables, structures thereof and the like may also be stored in association with the electronic document including the tables. This flow is thus performed every time an electronic document is input to the input/output device 11, so that information is accumulated in the storage 16.

However, as mentioned above, the tables accumulated in the storage 16 have various structure, and it is difficult to determine their corresponding relationships. Thus, the converter 13 converts the tables stored in the storage 16 based on the analysis result to make it easy to determine the corresponding relationships.

Figure 5:
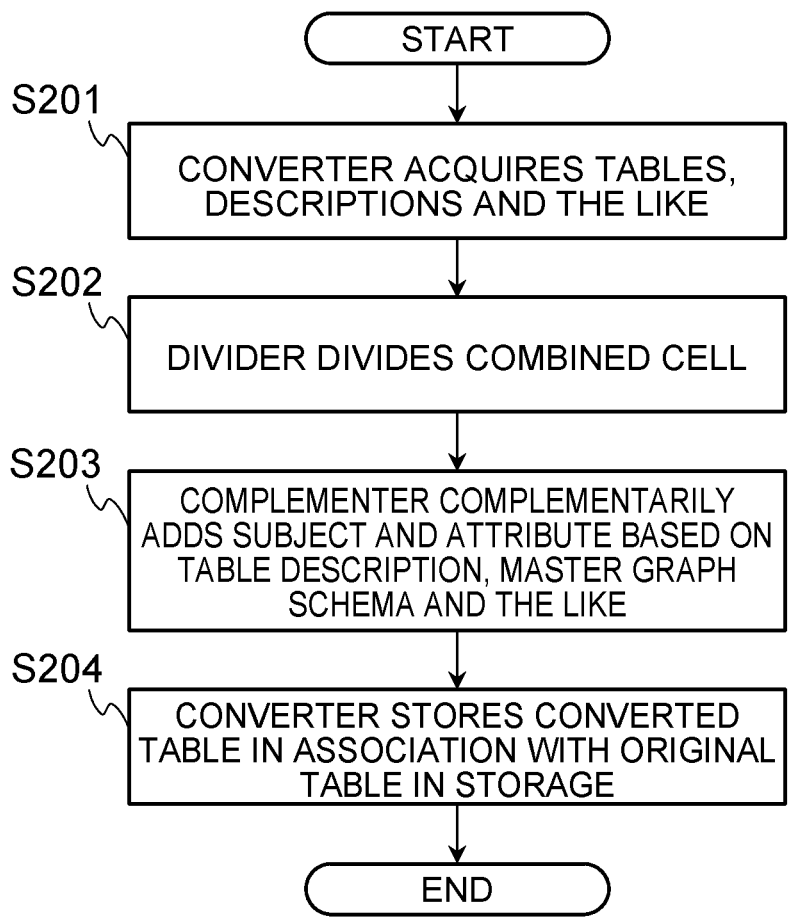
FIG. 5 is a diagram illustrating an example of a processing flow of a converter.

FIG. 5 is a diagram illustrating an example of a processing flow of the converter 13. This flow is performed after the processing of the analyzer 12 is performed. Note that the flow may be performed every time the processing of the analyzer 12 is performed, or may be collectively performed after the processing of the analyzer 12 is performed a plurality of times.

The divider 131 of the converter 13 acquires a table stored in the storage 16 (S201), and divides a combined cell in the table (S202). The division results in the same number of cells in each row and the same number of cells in each column. For example, the cell "Steel Material Thickness (mm)" in FIG. 2 is divided into six rows of cells. The content of the combined cell before being divided is entered into each divided cell.

For example, the source code of an electronic document such as HTML indicates cell combinations. The divider 131 may recognize the combined cell from the source code based on the analysis result of the table structure analyzer 123 to perform the division. The division may also be performed based on the number of adjacent cells or the like.

The combined cell may also be recognized based on a text included in the table. For example, if a cell including a newline code, which means the start of a new line, is detected as a result of the text analysis, the cell may be divided by the newline code. Also, for example, phrases that can be subjects and attributes may be registered in advance so that if one cell includes a plurality of registered phrases, the cell is divided by those phrases. For example, the table of FIG. 3 includes a cell indicating a character string "SM400ASM400B". The divider 131 may divide the cell into a cell indicating "SM400A" and a cell indicating "SM400B".

Whether a row or a column is added for the division may be determined based on whether subjects and attributes are arranged in a row or a column. For example, in FIG. 3, SM400C and the like, which belong to the same superordinate as those of "SM400A" and "SM400B", are arranged in the column direction. Accordingly, for dividing the above-mentioned cell in FIG. 3 into a cell indicating "SM400A" and a cell indicating "SM400B", a row is added.

FIGS. 6 and 7 are diagrams illustrating example tables after the division of combined cells. FIG. 6 is a diagram of the first example table on which to perform determination after the division. FIG. 7 is a diagram of the second example table on which to perform determination after the division. Note that, for clearly displaying the headings, cells for indicating values in the converted table of each figure are blanked. To determine whether the tables shown in FIGS. 2 and 3 have a corresponding relationship, the tables after the division shown in FIGS. 6 and 7 are compared, instead of comparing the tables shown in FIGS. 2 and 3.

In this manner, the headings corresponding to the cells can be recognized. However, as mentioned above, subjects and attributes may be omitted in some cases. For example, since the attribute "Yield Point or Yield Strength" is omitted in the example of FIG. 3, the attribute "Yield Point or Yield Strength" is also not included in the table after the division in FIG. 7. Thus, the complementer 132 complementarily adds an omitted subject and attribute (S203).

For example, the complementer 132 performs the complementation based on a table description obtained from the text analysis result. For example, in the example of FIG. 3, the title of the table is "Yield Point or Yield Strength". Since the character string "Yield Point or Yield Strength" is not included in the headings of the table, the complementer 132 determines to complementarily add the character string.

FIG. 8 is a diagram of the second example table on which to perform determination after the complementation. Cells indicating the attribute "Yield Point or Yield Strength" are added to the headings of all columns. An attribute that is indicated in the title, table description and the like but not indicated in the table is considered to be omitted from the table because the attribute corresponds to all cells. Thus, the omitted attribute may be added to all row headings or column headings.

There may be cases that the table description cannot be obtained, an attribute to be complementarily added is not indicated in the description, and the like. In those cases, the omitted attribute is complementarily added by referencing attribute information indicating attributes expected to be included in a table relating to a subject included in the table or a superordinate of the subject. The superordinate and the subject belonging to the superordinate are determined in advance.

Figure 9:
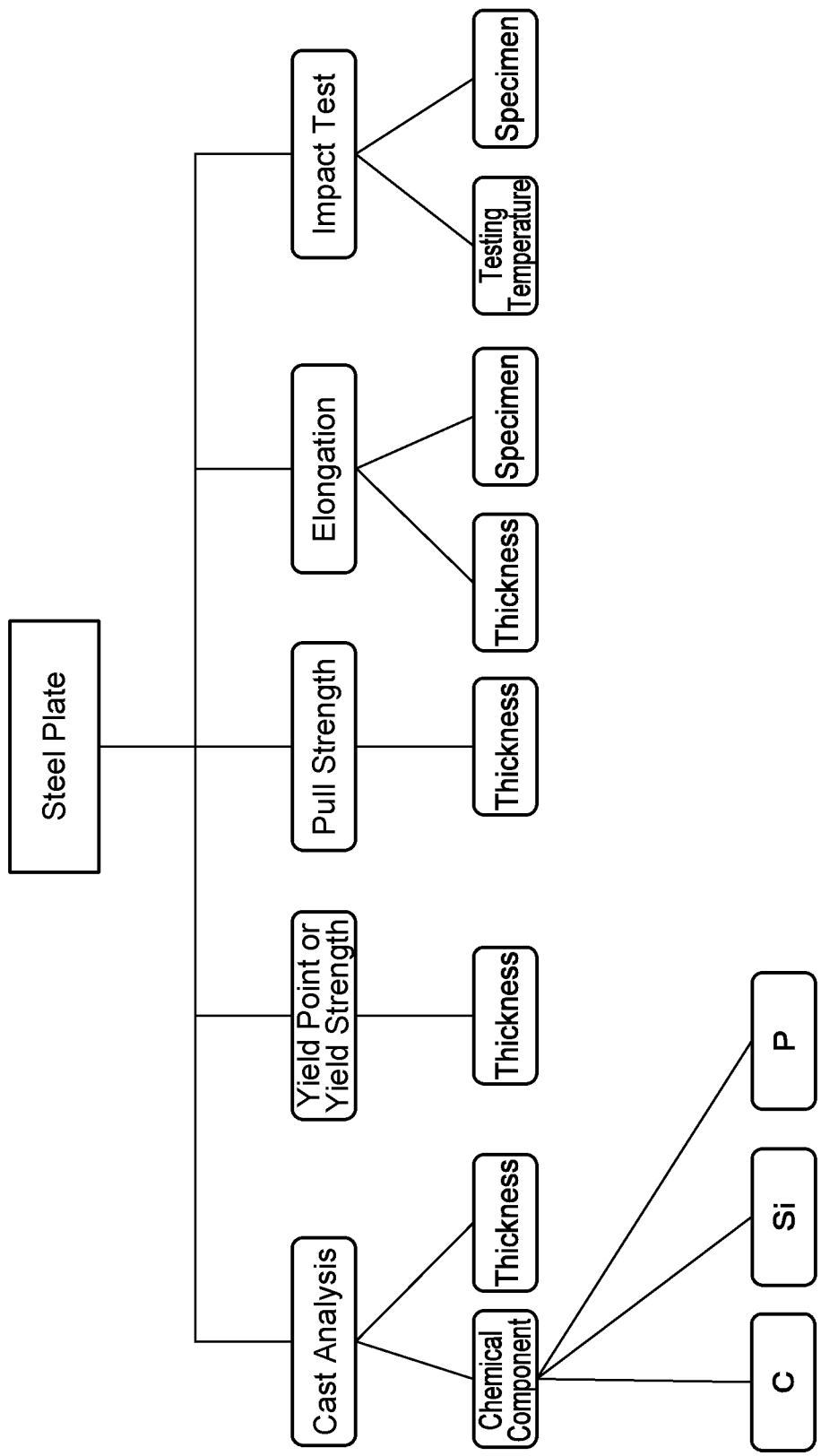
FIG. 9 is a diagram illustrating an example of a graph schema.

FIG. 9 is a diagram illustrating an example of a graph schema. The graph schema is a kind of attribute information, and is a graph indicating positional relationships between attributes when being indicated in headings of a table. It is assumed that the graph schema is generated in advance and is included in attribute information 163 stored in the storage 16. Note that a graph schema used for the complementation is particularly referred to as a master graph schema.

The graph schema in FIG. 9 is a graph schema relating to "Steel Plate", which is a superordinate to which "SM400B" belongs, which is a subject indicated in the tables of FIGS. 2 and 3. Thus, "Steel Plate" is indicated at the highest level.

Note that there may be a graph schema for "SM400B", and there may be a graph schema for "SM400 Material", which is a superordinate of "SM400B" and is a subordinate of "Steel Plate".

Attributes are indicated subordinate to the highest level in the graph schema. In this description, attributes located directly below the subject or superordinate indicated at the highest level in the graph schema are referred to as "independent attributes". In the example of FIG. 9, "cast analysis", "Yield Point or Yield Strength", "Pull Strength", "Elongation" and "Impact Test" are indicated as the independent attributes.

When being indicated in headings, the independent attributes are laterally arranged in the case of column headings or are vertically arranged in the case of row headings. In other words, the independent attributes are not contained in the same row or column. For example, a value corresponding to "pull strength" and "elongation" of SM400B cannot exist, and "pull strength" and "elongation" can be regarded as independent attributes.

Further attributes are indicated subordinate to the independent attributes. In this description, the attributes indicated subordinate to the independent attributes are referred to as "dependent attributes". The dependent attributes are attributes that are often indicated in the same row or column as the independent attributes. In other words, the dependent attributes are arranged above or below the independent attributes in the case of column headings or are arranged left or right to the independent attributes in the case of row headings. The independent attributes and the dependent attributes may have no relationships. In the example of FIG. 9, "Thickness", which is an attribute having no direct relationship with the independent attribute "Yield Point or Yield Strength", is indicated as a dependent attribute of "Pull Strength" or the like. This is because "Thickness" is an attribute relating to the subject, and a value for "Pull Strength" of SM400B having a "Thickness" not more than 16 can exist, for example.

FIG. 10 is a diagram illustrating a third example table on which to perform determination. In the table of FIG. 10, carbon (C), silicon (Si), manganese (Mn), phosphorus (P) and sulfur (S) are indicated as attributes. However, an attribute "Chemical Component" is not indicated. Also, the description indicated above the table does not include the phrase "chemical component". In such a case, an attribute name "chemical component" is complementarily added in the table by using the graph schema.

FIG. 11 is a diagram of the third example table on which to perform determination after the complementation. Combined cells are divided by the divider 131 as mentioned above. Also, cast analysis and chemical component are added to the row headings by the complementer 132.

The complementer 132 references the master graph schema, and recognizes that the attributes such as carbon (C) are dependent on the independent attribute "Chemical Component". The complementer 132 then recognizes that the attribute "chemical component" is not indicated in the table of FIG. 10 based on the text analysis result. In order to add the attribute "chemical component", the complementer 132 adds a row of column headings based on the fact that carbon (C) and the like are indicated in the column headings. The complementer 132 then adds "chemical component" to each cell in the columns indicating the dependent attributes such as carbon (C) and in the added row.

As shown in FIG. 10, there is a description "The steel plate is subjected to the test shown in 7., and its cast analysis is shown in the table below" for the table of FIG. 10. Thus, as mentioned above, the complementer 132 may also add an attribute "cast analysis", recognize that the attribute "chemical component" is dependent on the attribute "cast analysis" based on the graph schema, and add the attribute "chemical component" to the converted table.

Alternatively, the complementer 132 may recognize that the attribute "chemical component" is dependent only on the independent attribute "cast analysis" based on the master graph schema, and further add the attribute "cast analysis".

The complementer 132 may also change the names of attributes indicated in the table and determined to be similar based on the names of the attributes in the master graph schema to the names of the attributes in the master graph schema. This may eliminate orthographic variants for attributes. The orthographic similarity may be determined based on a known method such as the Levenshtein distance.

In this manner, the complementer 132 complementarily adds an attribute not included in a table based on a content of at least one of the table and an electronic document including the table, which can prevent tables having a corresponding relationship from erroneously determined as having no corresponding relationship.

The converter 13 stores a processing result in the storage 16 (S204), and this flow ends. For example, converted table information 164 indicating the converted tables and the like may be stored in association with the table information 162 indicating the unconverted tables. Note that the converted tables may be output via the input/output device 11. The converted tables may be output to accept confirmation and modification by the user. For example, it is possible that the user determines the corresponding relationships between the tables based on the converted tables.

Note that the master graph schema may be prestored in the storage 16, or may be generated and updated based on the processing result of the analyzer 12. In this embodiment, the attribute information generator 14 generates and updates the master graph schema.

The attribute information generator 14 acquires row headings and column headings of tables including the same subject or subjects having the same superordinate, and counts attributes included therein. When the number of included attributes exceeds a threshold, the attribute information generator 14 inputs them into the master graph schema. Note that, during the count, attribute names in the tables may be converted based on the Levenshtein distance or the like.

Dependency relationships between the attributes may also be determined based on the direction of arrangement of row headings (vertical) and the direction of arrangement of column headings (lateral).

A graph schema may also be generated from table descriptions, not only from the contents of the tables. For example, it is assumed that, as shown in FIG. 2, a description "table 1 illustrates the yield point, yield strength, pull strength and elongation of SMB 400" is detected by the text analyzer 122. The attribute information generator 14 extracts phrases in the description to acquire "table 1", "SMB400", "yield point", "yield strength", "pull strength", "elongation" and "illustrates". The attribute information generator 14 may then estimate a subject and attributes based on dependency between the acquired phrases and the like.

A dependency rule is registered in advance. For example, the subject can be estimated by registering in advance candidates that can be subjects such as "SM400A" and "SM400B". Also, information that when there is a character string "of" before a subject, there is an attribute before it is registered in advance. Also, information that a word "and" means parallel connection is registered. In this manner, the divider 131 recognizes that the character string "SM400B" relates to "yield point", "yield strength", "pull strength" and "elongation". That is, the divider 131 recognizes that "yield point", "yield strength", "pull strength" and "elongation" are attributes for the subject "SM400B" and are independent attributes based on the fact that they are parallelly connected.

In this manner, the attribute information generator 14 generates the master graph schema. The attribute information generator 14 may also generate separate graph schemas for the respective tables.

The determiner 15 performs determination on corresponding relationships between tables based on attributes included in the tables. The determiner 15 uses the tables converted by the converter 13 to perform the determination. Since the omitted attributes are complementarily added, the accuracy of the determination is improved as compared to the case of using uncomplemented tables.

Figure 12:
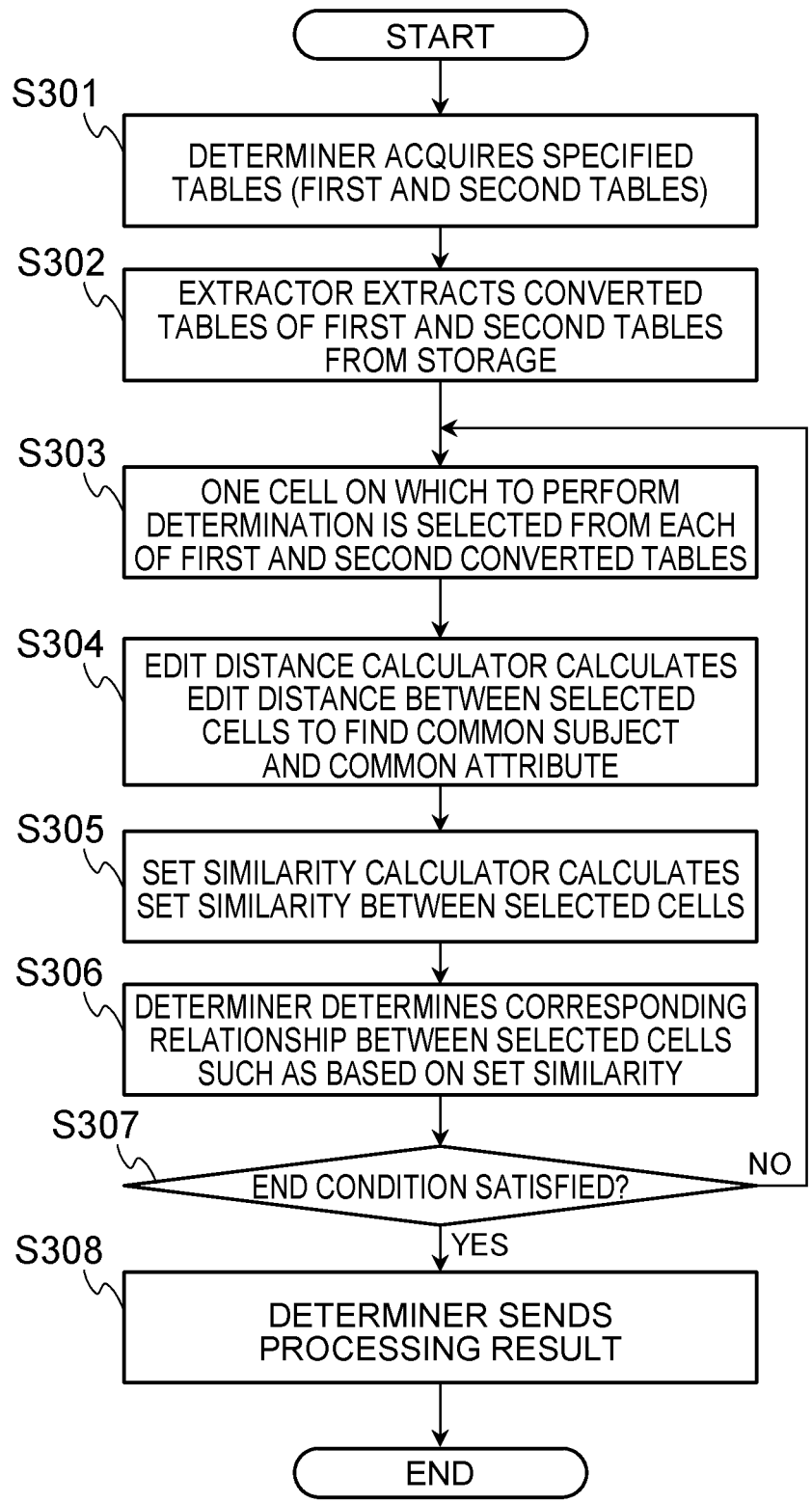
FIG. 12 is a diagram illustrating an example of a processing flow of a determiner.

FIG. 12 is a diagram illustrating an example of a processing flow of the determiner 15. It is assumed that this flow is started when information for identifying tables such as table identifiers and titles is input to the input/output device 11.

The determiner 15 receives specification of two tables (specified targets) via the input/output device 11 (S301). In this example, the two tables are referred to as a first table and a second table. The extractor 151 of the determiner 15 extracts a converted table of the first table and a converted table of the second table from the storage 16 (S302).

Note that one table may be specified and a table corresponding to the specified table may be extracted. For example, a table having a corresponding relationship with a table processed by the analyzer 12 and the converter 13 may be automatically detected by the determiner 15. In that case, tables may be extracted from the storage 16 one by one, and this flow may be repeatedly performed for each extracted table.

Next, one cell on which to perform determination is selected from each of the first and second converted tables (S303). The selection may be a combination of cells in the first and second tables that have not already been selected. The cells may be selected in order, or a combination of cells that have not already been selected may be randomly selected.

The edit distance calculator 152 calculates the edit distance between the selected cells, and finds a common subject and a common attribute (S304). Specifically, the edit distance calculator 152 calculates the edit distance between each of a subject and attributes corresponding to the selected cell of the first table and each of a subject and attributes corresponding to the selected cell of the second table. Based on the calculated edit distance, the edit distance calculator 152 then detects a subject and attributes common to both of the selected cell of the first table and the selected cell of the second table. This prevents them from being recognized to be different subjects and attributes due to orthogonal variants or the like.

Note that a subject and attributes corresponding to a cell are a subject and attributes indicated in at least one of headings of the column to which the cell belongs and headings of the row to which the cell belongs. For example, a subject and attributes corresponding to the cell enclosed by a bold frame in FIG. 6 are the subject and attributes enclosed by dotted frames. For example, they can be represented as {Yield Point or Yield Strength, Steel Material Thickness, more than 40 and not more than 75, SM400B, Mechanical Properties}. Similarly, a subject and attributes corresponding to the cell enclosed by a bold frame in FIG. 8 can be represented as {Yield Point or Yield Strength, Steel Material Thickness, more than 40 and not more than 75, SM400B}.

Note that a subject and attributes corresponding to a cell may be a subject and attributes indicated in headings of either of the column and row.

The edit distance may be calculated using a known calculation method such as the Levenshtein distance. A threshold or the like for recognizing the common subject and common attribute may be set appropriately. If the complementer 132 has already corrected orthogonal variants, only completely coinciding one may be determined to be a common subject or common attribute without calculating the edit distance.

The set similarity calculator 153 calculates a set similarity between the selected cell of the first table and the selected cell of the second table (S305). Specifically, the set similarity calculator 153 calculates the set similarity by regarding the subject and attributes corresponding to the selected cell of the first table as a set corresponding to the selected cell of the first table and regarding the subject and attributes corresponding to the selected cell of the second table as a set corresponding to the selected cell of the second table. The attributes corresponding to each cell may be attributes indicated in headings of the row and column to which the cell belongs. Alternatively, they may be attributes indicated in headings of either of the row and column.

The set similarity may be calculated using a known calculation formula such as the Jaccard index. For example, the Jaccard index J(A,B) for a set A and a set B is expressed by the equation below:

$$J(A, B) = \frac{|A \cap B|}{|A \cup B|} \quad \text{[Expression 1]}$$

The number of elements included in the intersection of the bold-framed cell in FIG. 6 and the bold-framed cell in FIG. 8 is four, and the number of elements included in the union thereof is 5. Thus, the Jaccard index is calculated as 0.8. Since the omitted attributes are complementarily added, the set similarity can be calculated more accurately.

The determiner 15 determines a corresponding relationship between the selected cell of the first table and the selected cell of the second table based on the set similarity (S306) and the like. A threshold for the determination may be set appropriately. If there is no common subject, it may be determined that there is no corresponding relationship, regardless of the value of the set similarity.

After the determination, if an end condition is not satisfied (NO in S307), the process returns to S303, and cells on which to perform determination are selected. The end condition may be that determination on corresponding relationships is performed for all combinations of the cells of the first table and the cells of the second table. Note that the determination may be performed on limited cells, not all the combinations. An upper limit of the number of times of determination or the like may also be set as the end condition.

If the end condition is satisfied (YES in S307), the determiner 15 sends processing results such as determination results and identifiers of tables having corresponding relationships to the input/output device 11 (S308), and this flow ends. Note that the destination may also be the storage 16. In response, the user can recognize whether the specified tables have a corresponding relationship, for example.

As described above, when information that should be indicated in a heading of a table is omitted, the information processing apparatus 1 of this embodiment complements the table. Also, if a heading of the table is indicated in a plurality of rows or columns, the table is divided. By analyzing a plurality of electronic documents and tables included therein in this manner, tables having a corresponding relationship can be detected.

Note that at least part of the above embodiment may be realized by a dedicated electronic circuit (i.e., hardware) such as an IC (Integrated Circuit) having integrated therein a processor, a memory and the like. At least part of the above embodiment may be realized by executing software (programs). For example, the processing in the above embodiment can be realized by using a general-purpose computer apparatus as basic hardware to cause a processor such as a CPU provided to the computer apparatus to execute programs.

For example, a computer can be used as the apparatus of the above embodiment by causing the computer to read dedicated software stored in a computer-readable storage medium. The type of the storage medium is not particularly limited. Also, the computer can be used as the apparatus of the above embodiment by causing the computer to install dedicated software downloaded via a communication network. In this manner, information processing by the software is concretely implemented by using hardware resources.

Figure 13:
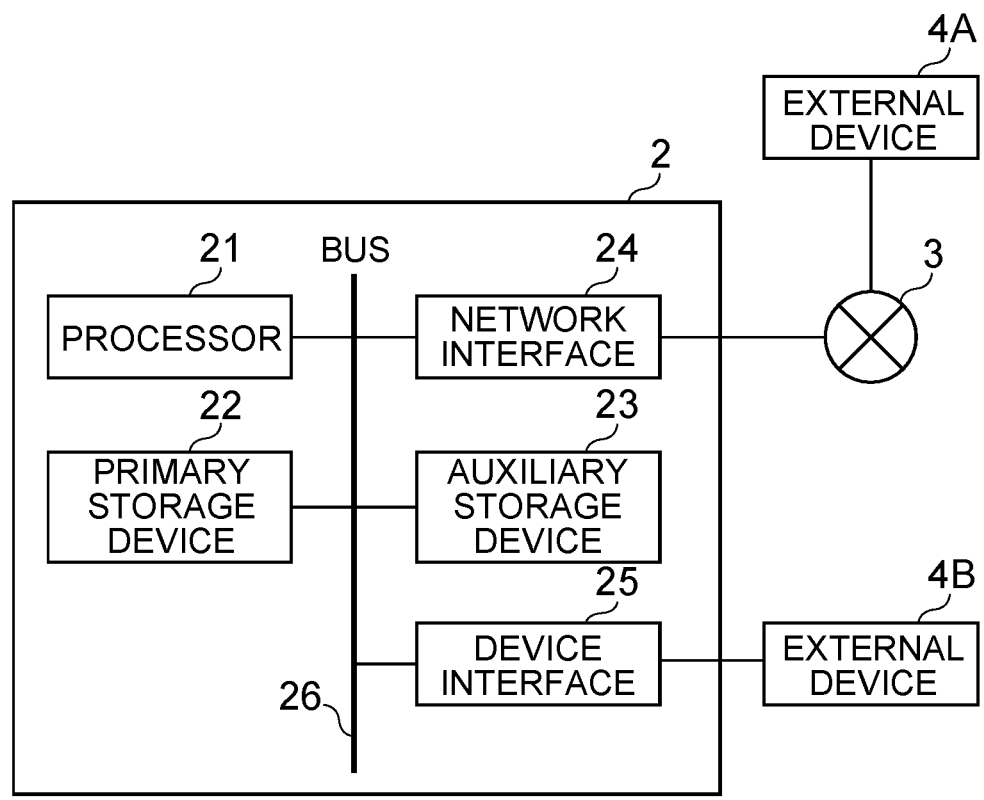
FIG. 13 is a block diagram illustrating an example of a hardware configuration according to an embodiment of the present invention.

FIG. 13 is a block diagram illustrating an example of a hardware configuration in an embodiment of the present invention. The information processing apparatus 1 can be realized as a computer apparatus 2 including a processor 21, a primary storage device 22, an auxiliary storage device 23, a network interface 24 and a device interface 25, which are connected via a bus 26. The storage 16 can be realized by the primary storage device 22 or the auxiliary storage device 23, and other components can be realized by the processor 21.

Note that, although the computer apparatus 2 of FIG. 13 includes one for each component, it may include a plurality of identical components. Also, although one computer apparatus 2 is shown in FIG. 13, software may be installed on a plurality of computer apparatuses so that the plurality of computer apparatuses each execute different part of processing of the software.

The processor 21 is an electronic circuit including a control device and an operation device of the computer. The processor 21 performs operation processing based on data and programs input from devices or the like in the internal configuration of the computer apparatus 2, and outputs operation results and control signals to the devices or the like. Specifically, the processor 21 executes an OS (Operating System) of the computer apparatus 2, applications and the like, and controls the devices constituting the computer apparatus 2. The processor 21 is not particularly limited as long as it can perform the above processing.

The primary storage device 22 is a storage device to store instructions executed by the processor 21, various data and the like, and information stored in the primary storage device 22 is directly read by the processor 21. The auxiliary storage device 23 is a storage device other than the primary storage device 22. Note that these storage devices refer to any electronic components capable of storing electronic information, and may be memories or storages. The memories include volatile memories and non-volatile memories, either of which may be used.

The network interface 24 is an interface for connecting to a communication network 3 in a wireless or wired manner. Any network interface conforming to an existing communication standard may be used as the network interface 24. The network interface 24 may perform information exchange with an external device 4A communicatively connected via the communication network 3.

The device interface 25 is an interface such as a USB in direct connection with an external device 4B. The external device 4B may be an external storage medium, or may be a storage device such as a database.

The external devices 4A and 4B may be output devices. For example, the output devices may be display devices for displaying images, or may be devices for outputting sounds, or the like. Examples include an LCD (Liquid Crystal Display), a CRT (Cathode Ray Tube), a PDP (Plasma Display Panel), a speaker and the like, there is no limitation thereto.

Note that the external devices 4A and 4B may also be input devices. The input devices include devices such as a keyboard, a mouse and a touch panel, and provide information input by these devices to the computer apparatus 2. The signals from the input devices are output to the processor 21.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus for complementing a heading of a table, the apparatus comprising a processor working as a divider and a complementer, wherein:
    the divider divides a combined cell included in each one of a first table and a second table and enters information from the combined cell into each divided cell, the combined cell being shared by multiple rows or columns;
    the complementer identifies a subject and an attribute of a content indicated by a first cell in the first table based on a comparison between the first table after division and the second table after division, wherein the attribute was not described in a heading of the first cell before being identified by the complementer; and
    after the complementer identifies the attribute, the complementer complementarily adds the identified attribute to the heading of the first cell.

2. The information processing apparatus according to claim 1, wherein
    the complementer identifies at least one of the subject or the attribute of the content indicated by the first cell based on at least one of a subject or an attribute of a second cell, different from the first cell, included in the first table.

3. The information processing apparatus according to claim 2, wherein:
    the complementer identifies a high-level subject which is superordinate of the subject of the content indicated by the first cell based on data indicating a hierarchical relationship of subjects; and
    the complementer regards at least one attribute included in a table relating to the high-level subject as the attribute of the content indicated by the first cell.

4. The information processing apparatus according to claim 3, wherein:
    the processor also works as a generator; and
    the generator generates attribute information indicating that attributes included in the table are related to the high-level subject based on an attribute included in a plurality of tables relating to at least one of a same subject or a content of one or more electronic documents including the plurality of tables.

5. The information processing apparatus according to claim 1, wherein
    the complementer identifies the subject and the attribute of the content indicated by the first cell, based on a description for the first table in the electronic document.

6. The information processing apparatus according to claim 5, wherein:
   the processor also works as a determiner; and
   the determiner determines a corresponding relationship between the first table and the second table based on the identified subject and attribute of the content indicated by the first cell and a subject and an attribute of a content indicated by a second cell included in the second table.

7. The information processing apparatus according to claim 6, wherein:
   the processor also works as a calculator;
   the calculator calculates a set similarity between the attribute corresponding to the first cell and the attribute corresponding to the second cell; and
   the determiner performs the determination based at least on the set similarity.

8. An information processing method for complementing a heading of a table, the method comprising:
   dividing a combined cell included in each one of a first table and a second table and enters information from the combined cell into each divided cell, the combined cell being shared by multiple rows or columns;
   identifying a subject and an attribute of a content indicated by a first cell in the first table based on a comparison between the first table after division and the second table after division, wherein the attribute was not described in a heading of the first cell before being identified by the complementer; and
   after the complementer identifies the attribute, complementarily adding the identified attribute to the heading of the first cell.

9. A non-transitory computer readable medium having stored thereon a program for complementing a heading of a table, the program comprising:
   dividing a combined cell included in each one of a first table and a second table and enters information from the combined cell into each divided cell, the combined cell being shared by multiple rows or columns;
   identifying a subject and an attribute of a content indicated by a first cell in the first table based on a comparison between the first table after division and the second table after division, wherein the attribute was not described in a heading of the first cell before being identified by the complementer; and
   after the complementer identifies the attribute, complementarily adding the identified attribute to the heading of the first cell.

* * * * *

UNITED STATES PATENT AND TRADEMARK OFFICE
CERTIFICATE OF CORRECTION

PATENT NO. : 11,526,660 B2
APPLICATION NO. : 17/013687
DATED : December 13, 2022
INVENTOR(S) : Ruigang Zhang It is certified that error appears in the above-identified patent and that said Letters Patent is hereby corrected as shown below:

In the Claims

Claim 8, Column 13, Line 21, "and enters information" should read --and entering information--.

Claim 9, Column 14, Line 12, "and enters information" should read --and entering information--.

Signed and Sealed this
Eleventh Day of July, 2023

Katherine Kelly Vidal
*Director of the United States Patent and Trademark Office*